(No Model.)
T. W. BROOKS.
GROUPING AND MOUNTING AIR VALVES.
No. 589,927. Patented Sept. 14, 1897.
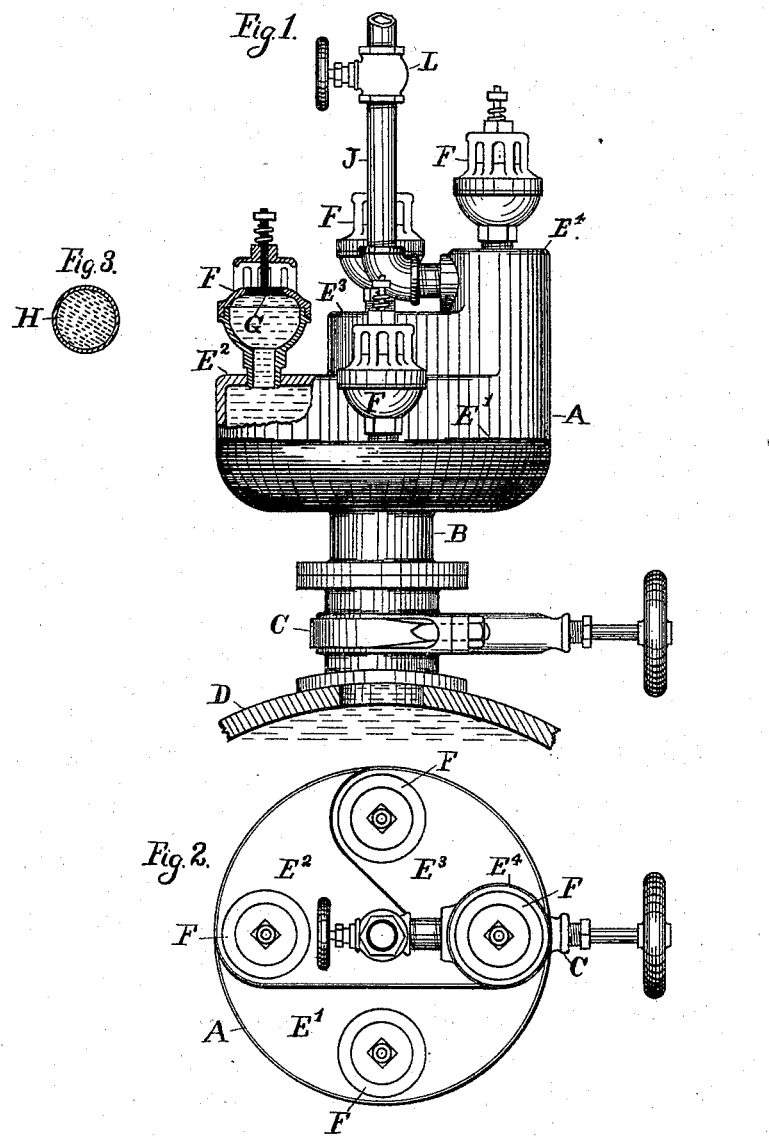
WITNESSES:
Edw. S. Cobb.
Wilson D. Berit, Jr.
INVENTOR
Thomas W. Brooks
BY
John Richards
ATTORNEY.

UNITED STATES PATENT OFFICE.

THOMAS W. BROOKS, OF SAN FRANCISCO, CALIFORNIA.

GROUPING AND MOUNTING AIR-VALVES.

SPECIFICATION forming part of Letters Patent No. 589,927, dated September 14, 1897.

Application filed September 24, 1895. Renewed February 5, 1897. Serial No. 622,203. (No model.)

*To all whom it may concern:*

Be it known that I, THOMAS W. BROOKS, a citizen of the United States, residing in the city and county of San Francisco, State of California, have invented certain new and useful Improvements in Grouping and Mounting Air-Valves; and I hereby declare the following specification and the drawings therewith to be a complete description of my invention and the manner of applying the same in practice.

My invention relates to valves for the induction and eduction of air in water-pipes or vessels that are filled and emptied intermittently or by accident.

My invention consists in the arrangement of such valves, preferably of uniform size, in groups or series, the number of valves being adapted to suit the required capacity or the size of the pipes to which the valves are applied. It also consists in a mode of setting such valves in different planes or at different heights above the pipe, so they will open and close successfully for the inlet or the escape of air, and in means of shutting off connection between the valves and the pipe, so as to permit their removal for repairs while the pipe is under pressure.

The objects of my invention, briefly stated, are to attain a uniform and systematic manufacture of the valves and to secure a more perfect action of the same in use; also, to render them accessible for removal, replacement, or adjustment.

Referring to the drawings, Figure 1 is a side elevation of a group of air-valves arranged and mounted according to my invention. Fig. 2 is a plan view of Fig. 1. Fig. 3 is a section through a float-valve adapted for use instead of the metal one shown in Fig. 1 in the case of low pressure.

Similar letters of reference apply to like parts in the different figures of the drawings.

The main chamber A is connected by a nipple B with a valve C, attached to the main pipe, a section or arc D of which is shown in Fig. 1. This main chamber A is cored or hollow throughout, its top being arranged in steps $E'$, $E^2$, $E^3$, and $E^4$, making four different planes to receive the air-valves F, which can be of uniform size and construction, as set forth in Letters Patent No. 542,516, granted to me July 9, 1895, for improvement in air-valves, hence not requiring particular description here.

One of the valves F is shown in section with a metallic clack G, such as is employed for high pressures, and in Fig. 3 is shown in section a floating valve H, that is substituted for the metal one G in the case of low pressure when the issuing force of the water is not sufficient to raise and close the metal valve G, the action and functions being the same in both cases, as set forth in my previous Letters Patent before referred to.

Groups of valves, of which there can be any number required, are placed on the high points of a pipe-line, and if the water in the pipe is drawn off, as frequently happens, the valves open automatically by their gravity, permitting air to enter, and thus avoid external pressure on the pipe.

When the pipe is again filled, the contained air escapes through the valves until the chamber A fills with water. Then the valves F or H close automatically by buoyancy or by efflux of the water, and remain shut until the water and pressure again sink enough to permit the valves to fall and open. If these valves F are set in one plane, they will open and close simultaneously, and only partially at first if the volume of air is small or the pressure slight, and thus act imperfectly, or when there is a rush of water they will close at once, causing jar and concussion, endangering the pipes to which the valves are applied. When placed at different levels, as seen in Fig. 1, they open and close in succession, one at a time, the highest valve opening first when air is being admitted and the lowest one closing first when air is being expelled and water admitted. Thus opening and closing in succession the action is easy and without shock.

The planes or surfaces $E'$ $E^2$ $E^3$ $E^4$ can be made large enough to receive several of the valves F, and these planes can be two or more in number, as will be understood.

In the top chamber $E^4$, I insert a pipe J, having a valve L, through which air that accumulates under pressure can be drawn off. The same result can be attained by some means of forcibly opening one of the valves F.

If the valves F are to be removed for substitution or repairs, or if there is other work to be performed on the main chamber A, this is shut off from the pipe D by means of the valve C, which is again opened when the valves are ready for use.

Having thus explained the nature and objects of my invention and the manner of its use, what I claim as new, and desire to secure by Letters Patent, is—

1. In a system of air-valves as herein described, a hollow vessel or chamber communicating throughout, and provided on its top with inlets for air-valves at different heights, or levels, so as to secure successive opening and closing of the valves, in the manner substantially as described.

2. In a system of air-valves as herein described, a hollow vessel provided with a series of air-valves fixed in different planes, to secure successive opening and closing of the valves, and in combination therewith a valve to close communication between the hollow vessel and the pipe to which it is attached, substantially as described.

In testimony whereof I have hereunto affixed my signature in the presence of two witnesses.

THOS. W. BROOKS.

Witnesses:
ALFRED A. ENQUIST,
WILSON D. BENT, Jr.